(12) United States Patent
Bouzguarrou et al.

(10) Patent No.: US 10,620,960 B2
(45) Date of Patent: Apr. 14, 2020

(54) APPARATUS AND METHOD FOR PERFORMING BRANCH PREDICTION

(71) Applicant: Arm Limited, Cambridge (GB)

(72) Inventors: Houdhaifa Bouzguarrou, Valbonne (FR); Guillaume Bolbenes, Antibes (FR); Vincenzo Consales, Golfe Juan (FR)

(73) Assignee: Arm Limited, Cambridge (GB)

( * ) Notice: Subject to any disclaimer, the term of this patent is extended or adjusted under 35 U.S.C. 154(b) by 57 days.

(21) Appl. No.: 16/105,028

(22) Filed: Aug. 20, 2018

(65) Prior Publication Data

US 2020/0057643 A1    Feb. 20, 2020

(51) Int. Cl.
*G06F 9/38* (2018.01)

(52) U.S. Cl.
CPC .................. *G06F 9/3842* (2013.01)

(58) Field of Classification Search
None
See application file for complete search history.

(56) References Cited

U.S. PATENT DOCUMENTS 5,913,048 A * 6/1999 Cheong ............... G06F 9/3836
712/215
7,490,229 B2 * 2/2009 Tremblay ............ G06F 9/30105
712/239

(Continued)

*Primary Examiner* — Michael Sun
(74) *Attorney, Agent, or Firm* — Nixon & Vanderhye P.C.

(57) ABSTRACT

An apparatus and method are provided for performing branch prediction. The apparatus has processing circuitry for executing instructions out-of-order with respect to original program order, and event counting prediction circuitry for maintaining event count values for branch instructions, for use in making branch outcome predictions for those branch instructions. Further, checkpointing storage stores state information of the apparatus at a plurality of checkpoints to enable the state information to be restored for a determined one of those checkpoints in response to a flush event. The event counting prediction circuitry has training storage with a first number of training entries, each training entry being associated with a branch instruction. The event counting prediction circuitry implements a training phase for each training entry during which it seeks to determine an event count value for the associated branch instruction based on branch outcome behaviour of the branch instruction observed for instances of execution of the branch instruction that have been committed by the processing circuitry. The event counting prediction circuitry further has access storage with a second number of active entries, where the second number is less than the first number. Each active entry is associated with a branch instruction for which an event count value has been successfully determined during the training phase. The event counting prediction circuitry is arranged to make branch outcome predictions for branch instructions having an active entry. At each checkpoint, state information for the active entries is stored to the checkpointing storage. This provides a particularly efficient form of event counting prediction circuitry that can be used in out-of-order systems, while reducing the amount of state information that needs to stored into the checkpointing storage at each checkpoint.

19 Claims, 9 Drawing Sheets

(56) References Cited

U.S. PATENT DOCUMENTS

| | | | | |
|---|---|---|---|---|
| 7,496,908 | B2* | 2/2009 | DeWitt, Jr. | G06F 8/443 |
| | | | | 717/154 |
| 7,774,531 | B1* | 8/2010 | Karlsson | G06F 12/0862 |
| | | | | 710/107 |
| 8,578,139 | B2* | 11/2013 | Chaussade | G06F 9/30145 |
| | | | | 712/228 |
| 9,507,598 | B1* | 11/2016 | Bonanno | G06F 9/30058 |
| 9,898,385 | B1* | 2/2018 | O'Dowd | G06F 11/00 |
| 2012/0005515 | A1* | 1/2012 | Reddi | G06F 1/28 |
| | | | | 713/340 |
| 2015/0378915 | A1* | 12/2015 | Gschwind | G06F 9/467 |
| | | | | 711/130 |
| 2017/0090930 | A1* | 3/2017 | Priyadarshi | G06F 9/3867 |
| 2017/0364792 | A1* | 12/2017 | Chai | G06F 9/46 |
| 2018/0293076 | A1* | 10/2018 | Sadasivam | G06N 3/08 |

\* cited by examiner

FIG. 5

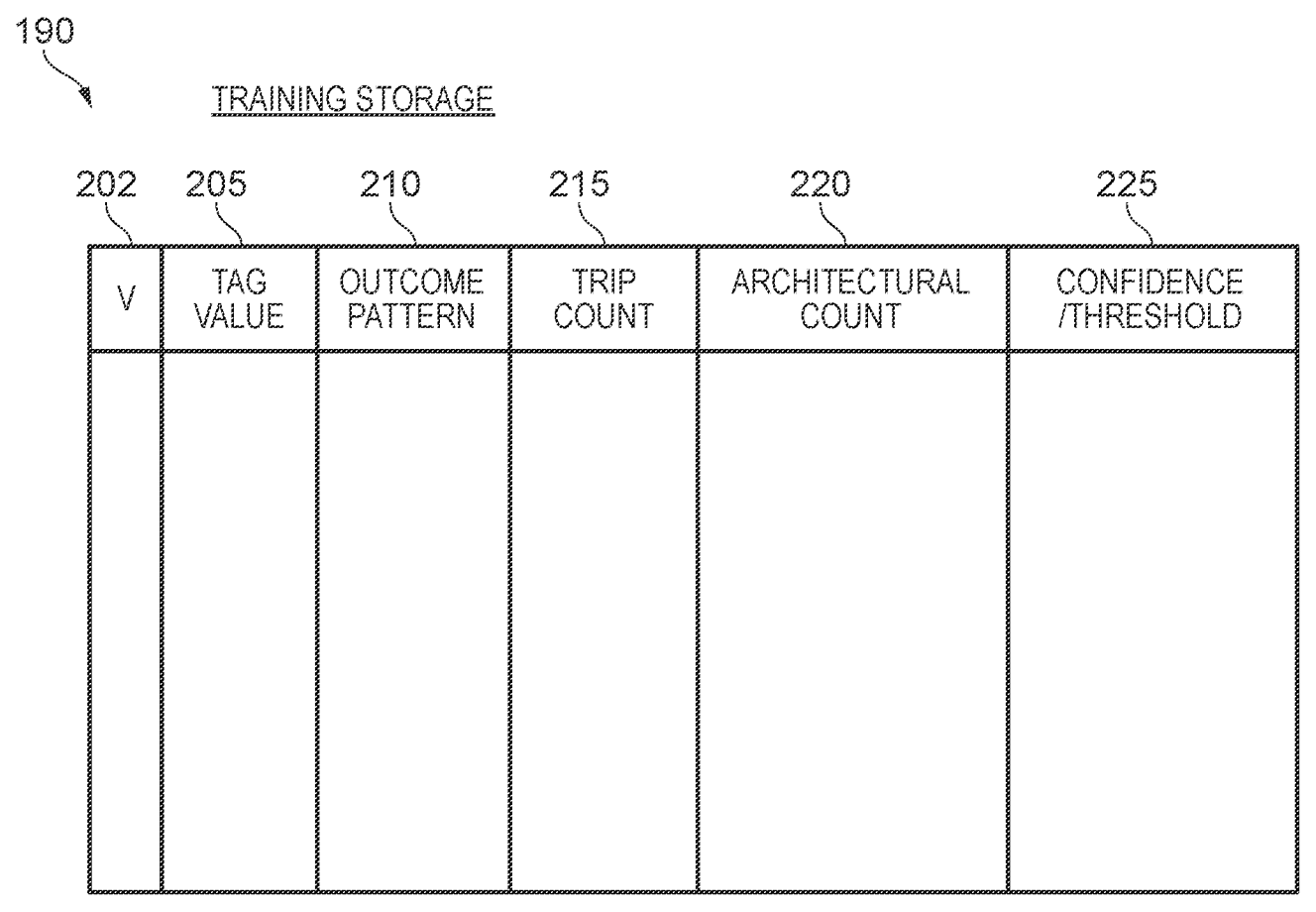

| TRAINING STORAGE | | | | | |
|---|---|---|---|---|---|
| V | TAG VALUE | OUTCOME PATTERN | TRIP COUNT | ARCHITECTURAL COUNT | CONFIDENCE /THRESHOLD |
| | | | | | |

190
202 205 210 215 220 225

APPARATUS AND METHOD FOR PERFORMING BRANCH PREDICTION

BACKGROUND

The present technique relates to an apparatus and method for performing branch prediction.

In order to seek to increase the performance of data processing systems, it is known to use branch prediction circuitry to seek to make predictions in respect of branch instructions. The predictions are then used by fetch circuitry to determine the instructions to be fetched from memory for execution by the processing circuitry of the data processing system. In particular, branch instructions can cause a change in flow of the instructions being executed, dependent on whether the branch is taken or not taken. If the system were merely to wait until the processing circuitry has executed the branch instruction (and hence it is known whether the branch is taken or not taken) before fetching the next instructions to be executed, this would have a significant impact on performance. Instead, branch prediction circuitry is used to seek to predict whether a branch will be taken or not taken, so that the fetch circuitry can continue to fetch instructions on the basis of that prediction. If the prediction later proves wrong, then the processing pipeline can be flushed, and processing can be resumed from the point of misprediction.

In order to enable the processing circuitry to be restored to a point where it can resume execution following a misprediction, it is necessary to store in checkpointing storage state information of the apparatus at a plurality of checkpoints, to hence enable the state information to be restored for one of those checkpoints in response to a flush event. Potentially, a significant amount of state information needs to be stored at each checkpoint, and this includes information maintained by the various components with the branch prediction circuitry. This can become particularly problematic in out-of-order (OoO) processing systems where the processing circuitry is able to execute instructions out-of-order with respect to original program order, and hence for which there can be a high degree of speculative processing being performed within the apparatus. Some types of branch prediction components used within branch prediction circuitry may require a significant amount of storage to be set aside within the checkpointing storage to store state information of those branch prediction components, and in OoO systems this storage requirement can make the use of such branch prediction components unattractive. Accordingly, it would be desirable to seek to reduce the storage requirements for state information associated with such branch prediction components.

SUMMARY

In one example configuration, there is provided an apparatus comprising: processing circuitry to execute instructions out of order with respect to original program order; event counting prediction circuitry to maintain event count values for branch instructions, for use in making branch outcome predictions for those branch instructions; checkpointing storage to store state information of the apparatus at a plurality of checkpoints to enable the state information to be restored for a determined one of those checkpoints in response to a flush event; the event counting prediction circuitry comprising training storage having a first number of training entries, each training entry being associated with a branch instruction, the event counting prediction circuitry being arranged to implement a training phase for each training entry during which the event counting prediction circuitry is arranged to seek to determine an event count value for the associated branch instruction based on branch outcome behaviour of the branch instruction observed for instances of execution of the branch instruction that have been committed by the processing circuitry; the event counting prediction circuitry further comprising active storage having a second number of active entries, where the second number is less than the first number, each active entry being associated with a branch instruction for which an event count value has been successfully determined during the training phase, and the event counting prediction circuitry being arranged to make branch outcome predictions for branch instructions having an active entry; wherein, at each checkpoint, state information for the active entries is stored to the checkpointing storage.

In another example configuration, there is provided a method of performing branch prediction in an apparatus having processing circuitry to execute instructions out of order with respect to original program order, comprising: employing event counting prediction circuitry to maintain event count values for branch instructions, for use in making branch outcome predictions for those branch instructions; storing in checkpointing storage state information of the apparatus at a plurality of checkpoints to enable the state information to be restored for a determined one of those checkpoints in response to a flush event; providing the event counting prediction circuitry with training storage having a first number of training entries, each training entry being associated with a branch instruction; implementing a training phase for each training entry during which the event counting prediction circuitry is arranged to seek to determine an event count value for the associated branch instruction based on branch outcome behaviour of the branch instruction observed for instances of execution of the branch instruction that have been committed by the processing circuitry; providing the event counting prediction circuitry with active storage having a second number of active entries, where the second number is less than the first number, each active entry being associated with a branch instruction for which an event count value has been successfully determined during the training phase; employing the event counting prediction circuitry to make branch outcome predictions for branch instructions having an active entry; and at each checkpoint, storing state information for the active entries to the checkpointing storage.

In a yet further example configuration, there is provided an apparatus comprising: processing means for executing instructions out of order with respect to original program order; event counting prediction means for maintaining event count values for branch instructions, for use in making branch outcome predictions for those branch instructions; checkpointing storage means for storing state information of the apparatus at a plurality of checkpoints to enable the state information to be restored for a determined one of those checkpoints in response to a flush event; the event counting prediction means comprising training storage means having a first number of training entries, each training entry being associated with a branch instruction, the event counting prediction means for implementing a training phase for each training entry during which the event counting prediction means seeks to determine an event count value for the associated branch instruction based on branch outcome behaviour of the branch instruction observed for instances of execution of the branch instruction that have been committed by the processing means; the event counting prediction means further comprising active storage means having a second number of active entries, where the second number is less than the first number, each active entry being associated with a branch instruction for which an event count value has been successfully determined during the training phase, and the event counting prediction means for making branch outcome predictions for branch instructions having an active entry; wherein, at each checkpoint, state information for the active entries is stored to the checkpointing storage means.

BRIEF DESCRIPTION OF THE DRAWINGS

The present technique will be described further, by way of example only, with reference to examples thereof as illustrated in the accompanying drawings, in which:

FIG. 5 illustrates the content of entries within the training storage of FIG. 4 in accordance with one example arrangement;

DESCRIPTION OF EXAMPLES

Figure 1:
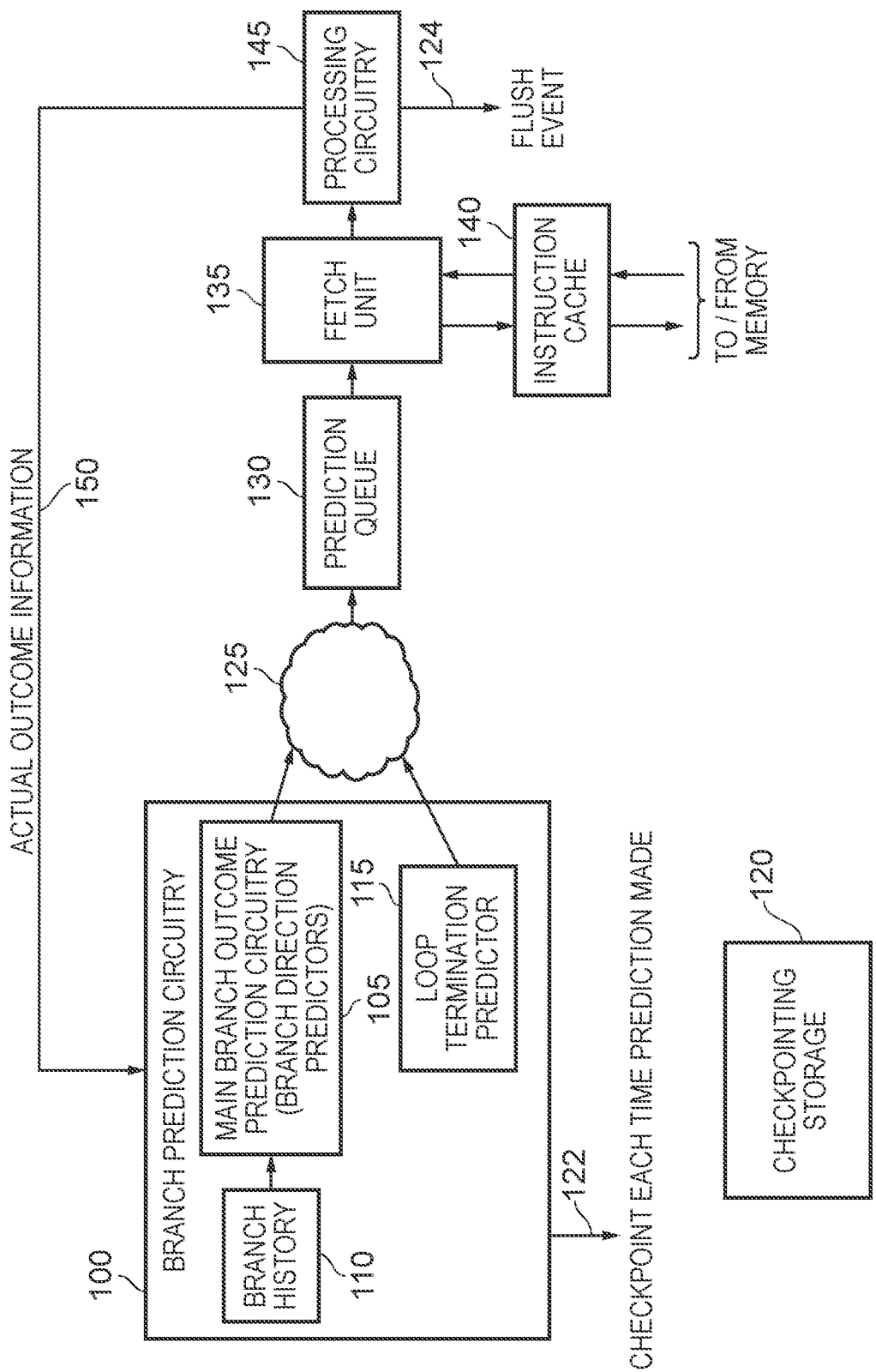
FIG. 1 is a block diagram illustrating an apparatus in accordance with one example.

In accordance with one example arrangement, an apparatus is provided that has processing circuitry for executing instructions out-of-order with respect to original program order, and event counting prediction circuitry to maintain event count values for branch instructions, for use in making branch outcome predictions for those branch instructions. In addition, checkpointing storage is provided to store state information of the apparatus at a plurality of checkpoints to enable the state information to be restored for a determined one of those checkpoints in response to a flush event.

Typically, such event count prediction circuitry has required a significant amount of storage to be provided within the checkpointing storage for storing state information held by that event counting prediction circuitry, and this has often made the use of such event counting prediction circuitry unattractive in out-of-order systems. However, in accordance with the example implementations discussed herein, the event counting prediction circuitry is arranged in a particular manner that reduces the amount of state information that needs to be stored from it into the checkpointing storage on occurrence of each checkpoint.

In particular, rather than providing a storage having a plurality of entries, where each entry is associated with a branch instruction, and each entry is arranged to contain the same fields, the event counting prediction circuitry is instead arranged to have a training storage and an active storage, each of which can have a plurality of entries, but where at least some of the fields in the entries of the training storage differ to the fields in the entries of the active storage. By appropriate use of the entries within the training storage and the active storage, it has been found that the event counting prediction circuitry can be arranged such that, at each checkpoint, only state information for the active entries needs to be stored into the checkpointing storage, thereby significantly reducing the amount of storage required for such checkpointing activities.

In particular, the training storage has a first number of training entries, each training entry being associated with a branch instruction, and the event counting prediction circuitry is arranged to implement a training phase for each training entry during which the event counting prediction circuitry is arranged to seek to determine an event count value for the associated branch instruction based on branch outcome behaviour of the branch instruction observed for instances of execution of the branch instruction that have been committed by the processing circuitry. No predictions are made using the contents of the entries of the training storage, and instead those entries are maintained so as to seek to determine whether a confidence in the event count value can be obtained by monitoring the actual execution of the associated branch instruction by the processing circuitry.

In addition, the event counting prediction circuitry has active storage having a second number of active entries, where the second number is less than the first number, and each active entry is associated with a branch instruction for which an event count value has been successfully determined during the training phase (i.e. for which a sufficient level of confidence has been obtained in relation to the event count value during the training phase). The event counting prediction circuitry is then arranged to make branch outcome predictions for branch instructions having an active entry.

Since only the active entries are used for making branch predictions, then it is only state information from the active entries that needs to be stored to the checkpointing storage, and the content of the training entries can be omitted from the state information stored in the checkpointing storage. As a result, the storage requirements are significantly reduced, when compared with a typical event counting prediction circuitry that would merely have a single type of storage.

In one example implementation, each training entry is arranged to store only architectural information that does not need to be restored on occurrence of the flush event. Accordingly, it can be ensured that there is no need to store any of the content of the training entries to the checkpointing storage.

The contents of each active entry within the active storage can take a variety of forms. However, in one example implementation, each active entry contains a speculation count value that indicates a number of branch outcome predictions that have been made for the associated branch instruction during speculative operation of the processing circuitry. At each checkpoint, the state information that is stored in the checkpointing storage contains an indication of the speculation count value for each active entry. Hence, at each checkpoint it is known, for each branch instruction that is associated with an active entry, how many branch outcome predictions have been made for that branch instruction during the speculative operation of the processing circuitry. According, if it is later necessary to rewind the processor back to that checkpoint, it is known how many predictions will have been made at that checkpoint.

In one example implementation, when a branch instruction is initially allocated into the event counting prediction circuitry, that branch instruction is allocated into a training entry of the training storage, and upon occurrence of a promotion trigger, the branch instruction is then allocated into an active entry in the active storage. Hence, once a branch instruction is initially allocated, it will remain in a training entry for a period of time, and no branch outcome prediction will be made for that branch instruction. Only once the branch instruction is allocated into an active entry of the active storage following the promotion trigger will it then be possible to start making branch outcome predictions for that branch instruction.

In one example arrangement, the promotion trigger for a branch instruction is prevented until an event count value has been successfully determined for that branch instruction during the training phase. In one particular implementation, an event count value for a branch instruction is considered to have been successfully determined once a certain level of confidence has been achieved as to the stability of the event count value.

The promotion trigger can take a variety of forms, but in one example occurs when a prediction made by additional prediction circuitry for the branch instruction is determined to be incorrect, at a time where an event count value has been successfully determined for that branch instruction during the training phase.

When the branch instruction is allocated into an active entry in the active storage, the training entry for that branch instruction could be retained if desired, but in one example implementation that corresponding training entry is invalidated. Hence, at any particular point in time, a particular branch instruction will only have one entry within the event counting prediction circuitry, which will either be a training entry in the training storage or an active entry in the active storage. Such an arrangement allows for a particularly storage efficient implementation.

There are a number of reasons why an allocated entry in the active storage may be invalidated. For example, an entry may be invalidated so as to free up space to allow another branch instruction to be allocated an active entry in the active storage (for example because the promotion trigger has been received in respect of that other branch instruction). As another example, when the event counting prediction circuitry makes an incorrect branch outcome prediction for a branch instruction allocated into one of the active entries, the event counting prediction circuitry may be arranged to invalidate that active entry. In particular, if a misprediction has been made, this indicates a significantly reduced confidence in the information being maintained in the active entry, and hence it may be appropriate to invalidate that active entry in order to free up space within the active storage.

There are a number of steps that can be taken on invalidating the active entry. However, in one example arrangement the associated branch instruction is allocated back into a training entry of the training storage, so as to cause the training phase to be reinitiated for that branch instruction. However, alternatively, it may be decided not to allocate the associated branch instruction back into the training entry at that time.

As mentioned earlier, in one example implementation the event count value is successfully determined during the training phase when the training phase has resulted in a sufficient confidence in the event count value. There are a number of ways in which the confidence can be tracked during the training phase. In one example arrangement, each training entry has a training event count field to maintain an event count value that is updated during the training phase, and a confidence field to store a confidence value that indicates a confidence in accuracy of the event count value currently held in the event count field.

Further, in one example arrangement, each active entry has an active event count field, and on allocating a branch instruction to an active entry the active event count field is arranged to store the current event count value from the training event count field. Hence, the relevant event count information is captured within the active entry at the time a branch instruction is promoted from a training entry into an active entry.

The event counting prediction circuitry can take a variety of forms. However, in one particular example arrangement, the event counting prediction circuitry comprises loop termination prediction circuitry for maintaining an iteration count value for one or more loop controlling branch instructions that control repeated execution of an associated loop comprising a number of instructions. The iteration count value identifies the number of times the loop is to be executed. During the training phase for a loop controlling branch instruction, the loop termination prediction circuitry is arranged to seek to identify whether the associated loop has a stable iteration count value. The loop termination prediction circuitry is arranged, when the training phase has successfully identified a stable iteration count value, to allow one of the active entries to be allocated for the associated loop controlling branch instruction to enable branch outcome predictions to be made for that loop controlling branch instruction based on the identified stable iteration count value.

Such an arrangement provides a particularly efficient form of loop termination prediction circuitry, which can provide accurate branch outcome predictions for one or more loop controlling branch instructions, whilst significantly reducing the amount of state information that needs to be stored into checkpointing storage at each checkpoint, when compared with a traditional loop termination prediction circuit.

The training entries provided within the loop termination prediction circuitry can take a variety of forms. However, in one example arrangement, each training entry comprises: an identifier for the loop controlling branch instruction; a trip count value identifying the iteration count value for the loop; an architectural count value identifying, for an execution of the loop during the training phase, the number of iterations of the loop that have been committed by the processing circuitry; and a confidence indication identifying a confidence in the stability of the iteration count value. Since none of this information relates to predictions made by the loop termination prediction circuitry in respect of branch instructions, it does not need to be stored to the checkpointing storage on occurrence of a checkpoint.

With regard to the active entries within the loop termination prediction circuitry, these also can take a variety of forms, but in one example implementation each active entry comprises: an identifier of the branch instruction; a speculation count value that indicates a number of branch outcome predictions that have been made for the associated branch instruction during speculative operation of the processing circuitry; and an active trip count value, on allocating a branch instruction to an active entry, the active trip count value being set equal to the trip count value from the associated training entry.

The event counting prediction circuitry can be one of the components provided within branch prediction circuitry to make branch outcome predictions for branch instructions. The earlier-mentioned flush event can arise for a variety of reasons, but in one example arises on detection of a misprediction of the branch outcome of a branch instruction that has been made by the branch prediction circuitry. It should be noted that this flush event does not necessarily arise due to a misprediction made by the event counting prediction circuitry, but it is still necessary to maintain state information for the event counting prediction circuitry at each checkpoint, since irrespective of the branch that has been mispredicted, it will be necessary to restore the branch prediction circuitry to the state that existed at the point the misprediction was made.

Particular examples will now be described with reference to the Figures.

The techniques described herein can be applied to various types of event counting prediction circuitry. However, for the purposes of the illustrative examples discussed hereafter, an event counting prediction circuitry in the form of a loop termination predictor will be considered.

FIG. 1 is a block diagram of a data processing apparatus in accordance with one example implementation. The apparatus includes processing circuitry 145 for executing a sequence of instructions that have been fetched by a fetch unit 135. The fetch unit has access to one or more levels of cache, for example the instruction cache 140 and any lower levels of cache within a cache hierarchy, and initially seeks to fetch instructions from the instruction cache 140. In the event of a cache miss, the requests are propagated to a lower level of the cache hierarchy and/or main memory, in order to retrieve into the fetch unit the instructions that need executing.

Exactly which instructions are fetched by the fetch unit is dictated by the output of a prediction queue 130 which includes storage to maintain a series of prediction results produced by branch prediction circuitry 100, with those prediction results then being analysed to determine a sequence of instructions to be fetched for execution by the processing circuitry. As will be understood by those skilled in the art, when stepping through a sequence of instructions at sequential memory addresses, when a branch instruction is encountered, this can cause a change in instruction flow, dependent on whether the branch instruction is taken or not taken. If the branch is not taken, then the next instruction to be executed will typically be the instruction immediately following the branch instruction (i.e. the one at the next incremented memory address), but if the branch is taken then instruction flow will branch to a target address that is determined for that branch instruction, such that the next instruction to be executed will be an instruction at that target address. Often, branch instructions can be conditional, and hence for any particular conditional branch instruction it will not always be the case that the branch is taken or not taken. Branch prediction circuitry 100 can be used to seek to make predictions as to whether a branch will be taken or not taken, and may include a variety of different types of branch prediction components for use in making such predictions. Often, one or more of those components will operate based on knowledge of the previous history of actual execution by the processing circuitry, with that information being forwarded over path 150 back to the branch prediction circuitry 100.

Often the branch prediction circuitry can be arranged to review blocks of instructions at a time, and each block may for example be referred to as a predict block herein. The predict block will in one implementation include a number of consecutive instructions in the memory address space, for example 8 consecutive instructions. The branch prediction circuitry will seek to analyse the block of instructions in order to predict whether one or more of those instructions are branch instructions, and in the event that they are branch instructions, may seek to provide a prediction as to whether the branch is taken or not taken. This results in the generation of a prediction result for each predict block, which can be routed via combinatorial logic 125 to produce prediction results that are fed into the prediction queue 130. The prediction queue can then analyse these prediction results in order to determine which instructions should be fetched by the fetch unit for execution by the processing circuitry. In the event that the predictions made by the prediction circuitry are accurate, this can significantly improve performance, since the appropriate instructions can be fetched from the instruction cache 140/lower levels of the memory hierarchy in advance of them being required by the processing circuitry, avoiding the need to await the actual outcome of the branch instruction before fetching the next instructions. In the event that a branch prediction proves to be incorrect, then the state of the processing circuitry can be restored to the point prior to the misprediction taking place, and processing can then resume from that point.

In addition to predicting whether a branch will be taken or not taken, which can be referred to as branch direction prediction, the branch prediction circuitry may also perform other forms of branch prediction, for example seeking to predict the target address of a branch that is predicted as taken. However, for the purposes of the following discussion, the discussion of the activities of the branch prediction circuitry will concentrate on the branch direction prediction made by the branch prediction circuitry.

The branch prediction circuitry 100 may include main branch outcome prediction circuitry 105 that can comprise one or more branch direction predictors for seeking to predict a branch outcome of a branch instruction, and in particular whether that branch is predicted as taken or not taken. The predictions made will typically be influenced by the branch history 110 maintained to take into account the actual outcome information obtained from the processing circuitry 145 when branch instructions are executed, and hence taking into account the true taken/not taken behaviour of the branch instructions.

Figure 2A:
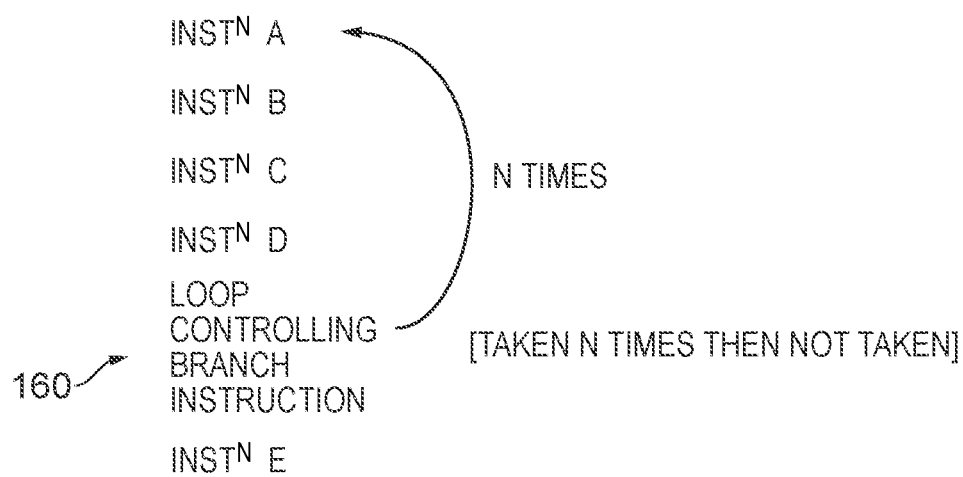
FIGS. 2A and 2B illustrate two different forms of loop controlling branch instruction that may be employed.
Figure 2B:
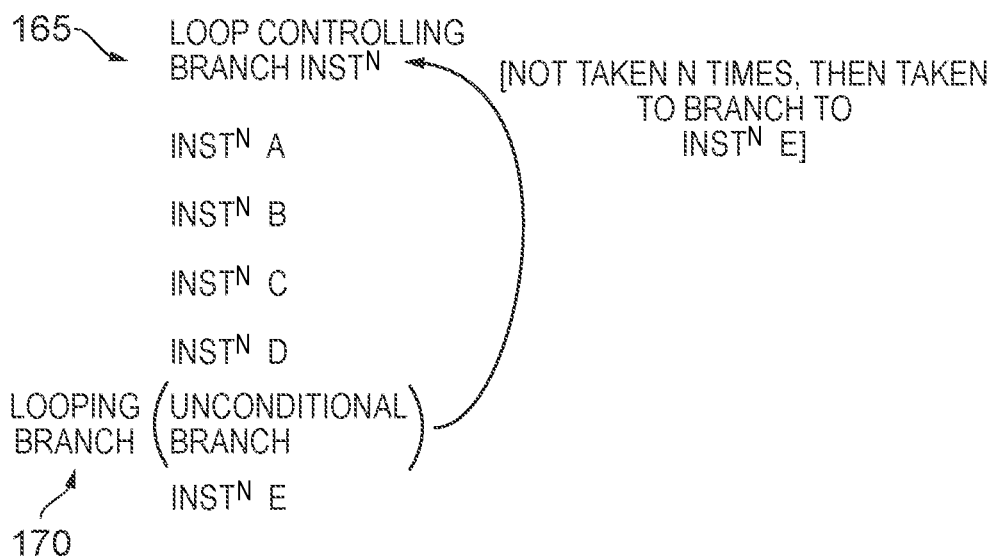

In addition to the main branch outcome prediction circuitry 105, the branch prediction circuitry 100 of FIG. 1 has a loop termination predictor 115 that is used to maintain branch outcome prediction information for one or more loop controlling branch instructions. Each loop controlling branch instruction is a branch instruction that is used to control repeated execution of a loop that comprises a number of instructions. Two examples forms of loop controlling branch instruction are shown in FIGS. 2A and 2B. FIG. 2A illustrates a sequence of instructions at consecutive memory addresses, where a loop controlling branch instruction 160 exists between instruction D and instruction E. When the loop controlling branch instruction is taken, the target address for the loop controlling branch instruction is the address of instruction A, and hence the loop controlling branch instruction identifies that instructions A to D form a loop. Due to the nature of the loop controlling branch instruction 160 it is expected that the loop controlling branch instruction will be taken a significant number of times, and then on the final iteration of the loop will not be taken, such that the next instruction to be executed thereafter will be instruction E. Once the loop has been initiated, the loop controlling branch instruction will be encountered frequently, and a prediction will be made each time for that loop controlling branch instruction. Each time a prediction is made, then the branch history 110 can be updated. This can cause a number of issues for a standard branch direction predictor. Firstly, the branch history will typically be of a finite size, and will quite quickly become heavily influenced by the predictions made in respect of the multiple instances of the loop controlling branch instruction. This can adversely affect the prediction accuracy that can be made with regard to other branch instructions. Further, on the final iteration of the loop controlling branch instruction, the prediction will be wrong, since by that stage it is expected that the normal branch prediction circuitry will predict the loop controlling branch instruction as strongly taken, and accordingly will also predict the loop controlling branch instruction as taken when the final iteration is reached. The loop termination predictor 115 is provided to alleviate the above problems.

In particular, when a misprediction is made using the standard branch prediction circuitry 105 for a branch instruction that has been strongly predicted correctly beforehand, then an entry can be made within the loop termination predictor 115 since it is likely that such a branch instruction will be a loop controlling branch instruction. The loop termination predictor is then arranged to monitor the behaviour of that loop controlling branch instruction for a number of future occurrences of the loop, in order to seek to determine whether a stable number of iterations is observed for the loop. Once there is a certain level of confidence in the stability of the iteration count, then the loop termination predictor can be used to make future predictions each time the loop controlling branch instruction is encountered. In particular, considering the example of FIG. 2A, once for the loop controlling branch instruction 160 there is a threshold level of confidence that the iteration count of the associated loop is stable, then the loop controlling branch instruction 160 within the loop termination predictor can be viewed as having an active entry, and thereafter predictions can be made for that loop controlling branch instruction each time the loop is executed. In accordance with the scheme in FIG. 2A, for the first N iterations, the loop termination predictor 115 will predict that the loop controlling branch instruction is taken each time it is encountered, but on a final iteration will predict that the loop controlling branch instruction is not taken.

As shown in FIG. 2B, another form of loop controlling branch instruction is the form 165 which can be provided at the beginning of a loop. In such instances there will typically be an unconditional branch, referred to herein as the looping branch instruction 170, which branches back to the loop controlling branch instruction 165, and hence defines the loop. It can be seen from a comparison of FIGS. 2A and 2B that in both instances the loop is effectively the same, and involves executing instructions A to D during each iteration of the loop. When using the form of loop controlling branch instruction in FIG. 2B, the branch outcome pattern for the loop controlling branch instruction will be different to that for the loop controlling branch instruction 160 of FIG. 2A, in that the loop controlling branch instruction 165 will be not taken N times, and then will be taken on a final iteration.

Figure 3:
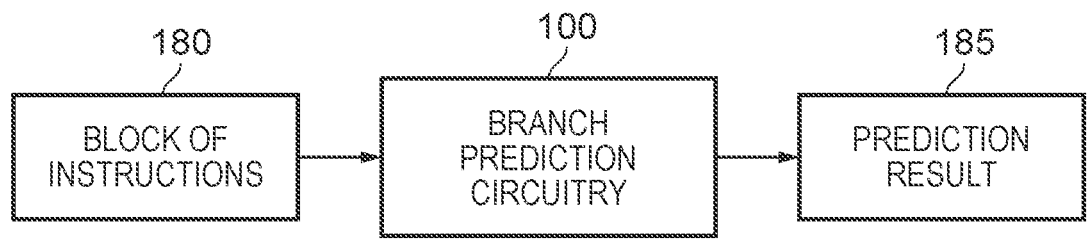
FIG. 3 illustrates how branch prediction circuitry can analyse a block of instructions so as to produce a prediction result.

FIG. 3 illustrates how the branch prediction circuitry 100 can be arranged to consider a block of instructions 180 and produce a prediction result for that block. The block of instructions will typically comprise a plurality of sequentially addressed instructions, and in one particular example is formed of 8 instructions. Starting with the instruction at the first memory address, the branch prediction circuitry seeks to predict whether any of the instructions in the block is a branch instruction, and if so seeks to predict the outcome of that branch instruction. Once a branch instruction is encountered that is predicted as taken, then no further analysis of any subsequent instructions in the block is necessary. The branch prediction circuitry 100 will then produce a prediction result 185 that identifies the instructions within the block that should be executed. In particular, it will identify one or more instructions that are to be executed, starting with the instruction at the first memory address. As soon as a branch instruction is encountered that is predicted as taken, then that forms the last instruction in the sequence to be executed, and is identified as such within the prediction result. The next block of instructions to be analysed by the branch prediction circuitry will in that instance be a sequence of instructions starting with the target address of the branch instruction that was predicted as taken.

From the above discussion, it will be appreciated that where loop controlling branch instructions can be identified, and the associated loop has a stable number of iterations, a more accurate prediction in respect of those loop controlling branch instructions can be made by the loop termination predictor 115, and its output can be used in preference to any prediction made by the main branch outcome prediction circuitry 105 for that branch instruction.

In order to enable the state of the apparatus to be restored in the event of a misprediction, then in one example arrangement, each time a branch prediction is made by the branch prediction circuitry 100, a checkpoint trigger is issued over path 122, which causes various items of state information of the apparatus to be stored into the checkpointing storage 120 in association with that checkpoint. In due course, if the processing circuitry 145 detects that a misprediction has been made in respect of a branch instruction, it can issue a flush event over path 124 indicating the point at which the misprediction has been made. This can be matched with one of the checkpoints, and then the state information held within the checkpointing storage for that checkpoint can be used to restore the state of the apparatus to the state that was present at that checkpoint. Thereafter, processing can be resumed from that point.

Figure 4:
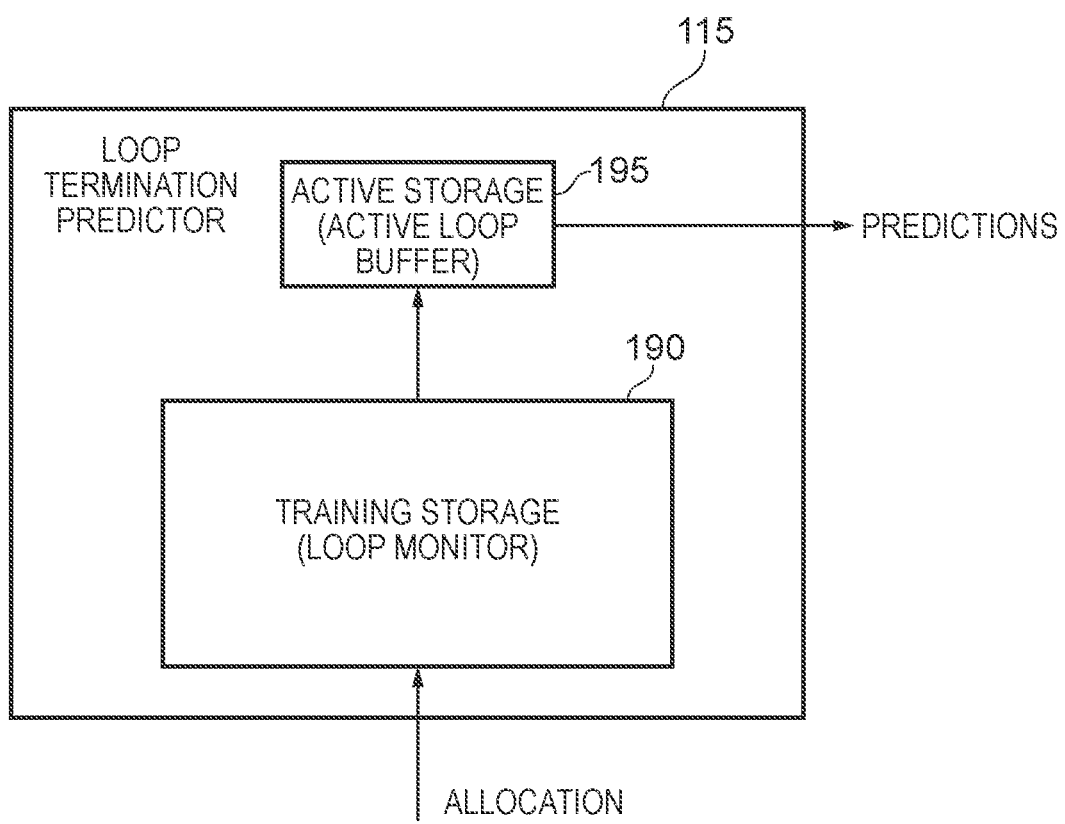
FIG. 4 is a block diagram illustrating how the loop termination predictor of FIG. 1 may be arranged to provide both a training storage and an active storage in accordance with one example configuration.

In order to reduce the amount of state information that needs to be saved to the checkpointing storage 120 from the loop termination predictor 115 at each checkpoint, the loop termination predictor is arranged in a manner illustrated in FIG. 4. In particular, the storage maintained within the loop termination predictor 115 to track event count information for each of the loop controlling branch instructions tracked within the loop termination predictor 115 is split into two parts. Firstly, there is training storage 190 (also referred to herein as a loop monitor) that provides a plurality of entries, and where each entry can be associated with a particular loop controlling branch instruction. As will be discussed in more detail herein, the information maintained in each such entry is used to seek to count, as each event, an iteration of the associated loop, and during the training phase the loop termination predictor 115 seeks to determine whether the total iteration count between initiation of a loop and termination of the loop is stable, by monitoring the iteration count for multiple instances of execution of the loop. During the training phase, no predictions are made for the loop controlling branch instruction. However, once the training phase has been completed, which occurs once a determined level of confidence has been reached as to the stability of the total iteration count, then a promotion trigger can be used to cause an entry to be allocated in the active storage 195 (also referred to herein as an active loop buffer) for the loop controlling branch instruction. At that point, the corresponding entry in the training storage can be invalidated. Thereafter, once a loop controlling branch instruction has been allocated an entry in the active storage 195, then the loop termination predictor 115 can begin to make predictions for that loop controlling branch instruction when the associated loop is subsequently encountered.

FIG. 5 is a diagram illustrating various fields that can be provided within the training storage 190 of the loop termination predictor 115 in accordance with one example arrangement. A valid field 202 is provided which can be set to identify that the corresponding entry is valid. A tag value field 205 is used to identify the loop controlling branch instruction that is associated with that entry, typically by storing a certain portion of the memory address of that instruction. The outcome pattern 210 is used to identify whether the associated loop controlling branch instruction is to be predicted as taken for all iterations except the final iteration, or to be predicted as not taken for all iterations except the final iteration. The trip count field 215 is used to identify the total number of iterations of the loop that occur between the loop being initiated and the loop being terminated, and during a training phase the loop termination predictor is arranged to seek to determine whether the total iteration count is stable, when considering multiple occurrences of the loop.

The architectural count field 220 is used to keep track of the total number of iterations of the loop that have been executed and committed by the processing circuitry 145. Hence, during the first occurrence of the loop during the training phase, the architectural count field 220 will be used to keep track of the total number of iterations that have been executed, and then when the loop terminates, that value is written into the trip count field 215. The next time the loop is encountered, the architectural count field is again used to keep track of the total number of iterations that have been executed. Then, when the loop terminates, it is determined whether the count in the architectural count field is the same as the one in the trip count field 215. If so, then a confidence value in the confidence field 225 can be increased. This process can be repeated for subsequent instances of the loop.

In one implementation, if at any point the loop has finished being processed by the processing circuitry, it is determined that the current architectural count 220 differs to the currently recorded trip count 215, then the confidence is reset, and then again the architectural count value is written into the trip count value 215 to identify the most recently observed total number of iterations. If the confidence value reaches a certain threshold, indicative of a level of confidence being reached in the stability of the total iteration count, then the training phase is considered to be complete, and the entry becomes a candidate for being promoted to the active storage 195.

In one implementation, the threshold can be increased each time the confidence is reset, so as to increase the number of times a stable iteration count needs to be observed before the confidence is considered high enough to start making predictions.

Once the threshold has been reached, then on occurrence of a promotion trigger, the loop controlling branch instruction can be allocated an active entry in the active storage 195. The promotion trigger can take a variety of forms, but in one example occurs when a prediction made by one of the other prediction components of the branch prediction circuitry 100 for the loop controlling branch instruction is determined to be incorrect, and at that time the training phase has been completed within the loop termination predictor 115 for the loop controlling branch instruction in question.

Figure 6:
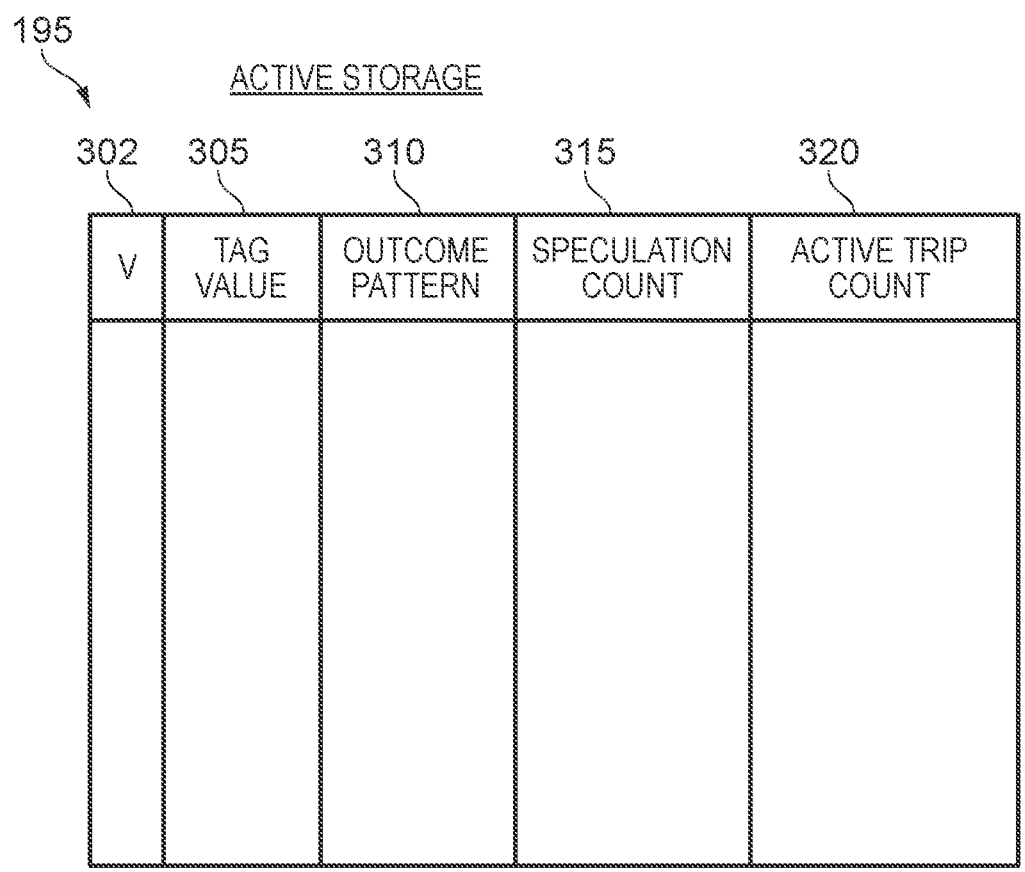
FIG. 6 illustrates the content of entries within the active storage of FIG. 4 in accordance with one example arrangement.

FIG. 6 is a diagram illustrating various fields that can be provided within the active storage 195 in accordance with one example arrangement. Each entry has a valid field 302 to identify whether the corresponding entry is valid. Further, a tag value field 305 and outcome pattern field 310 are provided, which are populated using the information in the corresponding tag value field 205 and outcome pattern field 210 of the associated training entry. Further, there is an active trip count field 320 which is set equal to the value of the trip count field 215 stored within the associated training entry at the time the promotion to the active storage takes place.

In addition, a speculation count field 315 is provided for maintaining a speculation count value. Once a loop controlling branch instruction has been allocated an active entry within the active storage 195, then on a subsequent occurrence of the associated loop, the loop termination predictor 115 can make a prediction as to the outcome of the loop controlling branch instruction for each iteration. Each time such a prediction is made, then the speculation count 315 is incremented, so as to keep track of the total number of predictions that have been made. This information can be used when determining how to reset the state of the processing circuitry in the event that a branch misprediction is made by the branch prediction circuitry 100 at some point. In particular, on occurrence of a checkpoint during execution of the code, the current contents of the active entries, including the speculation count values, can be saved to the checkpointing storage 120, so that if it subsequently becomes necessary to restore the state of the processing circuitry to that checkpoint, then the current speculation count value 315 can be overwritten with the speculation count value from that checkpoint.

Figure 7:
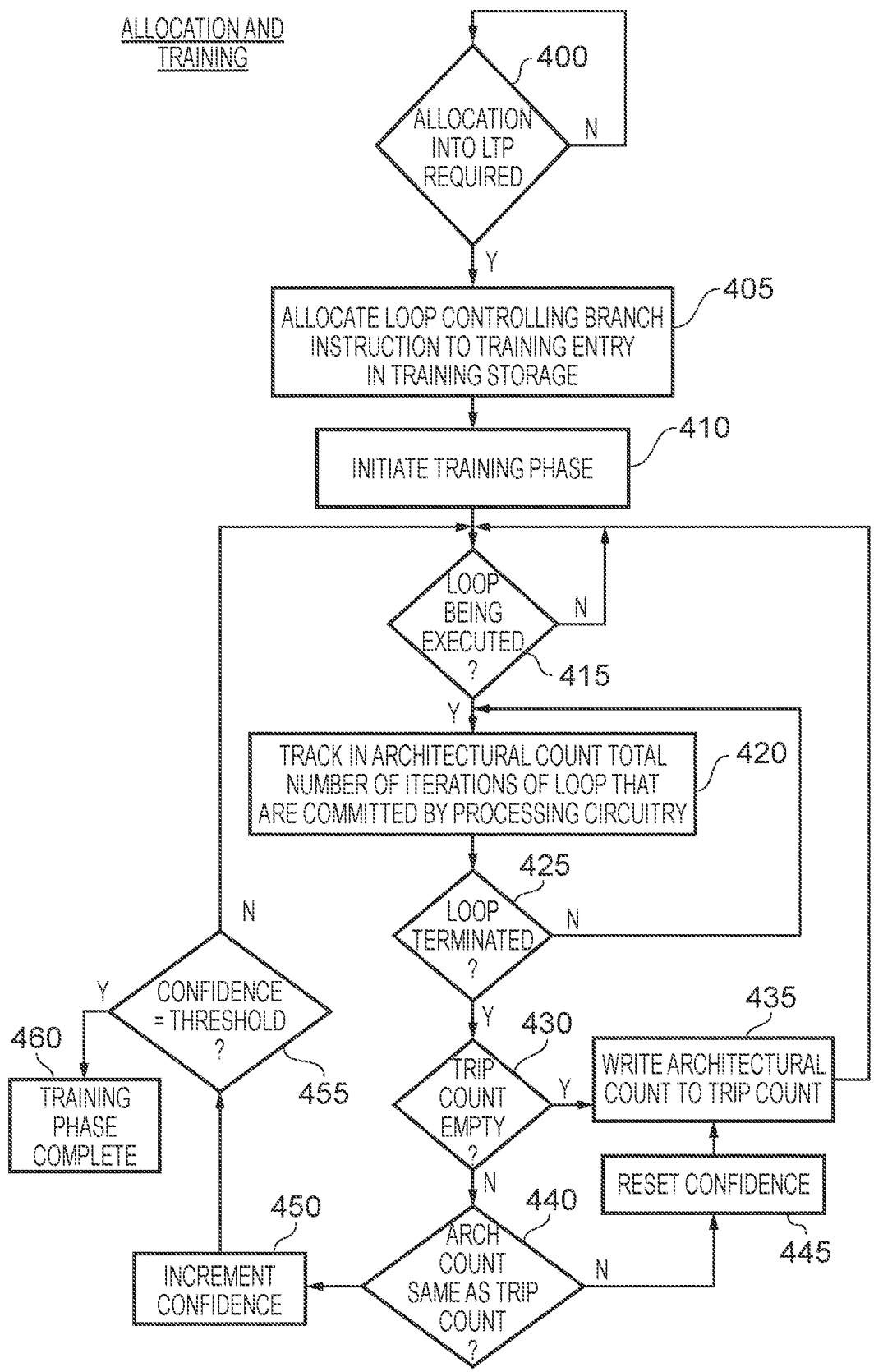
FIG. 7 is a flow diagram illustrating how an entry may be allocated within the training storage for a loop controlling branch instruction, and then a training phase implemented, in accordance with one example arrangement.

FIG. 7 is a flow diagram illustrating the allocation of an entry in the loop termination predictor 115 and performance of the training phase upon such allocation. At step 400, it is determined whether an allocation of a loop controlling branch instruction into the loop termination predictor (LTP) 115 is required. As mentioned earlier, a number of triggers can be used to cause such an allocation, but in one example implementation an allocation is made when a misprediction has been made by the main branch outcome prediction circuitry 105 for a loop controlling branch instruction.

Once it is determined that an allocation needs to be made, then at step 405 the loop controlling branch instruction is allocated to a training entry in the training storage 190, and thereafter at step 410 the training phase is initiated.

At step 415, it is determined whether the associated loop is being executed. Once execution of the loop is initiated, the process proceeds to step 420, where the total number of iterations of the loop are tracked, by populating the architectural count within the architectural count field 220 of the training entry. In particular, as each iteration is committed by the processing circuitry, the architectural count is incremented. At step 425, it is determined whether the loop has been terminated, and whilst that is not the case step 420 continues to be performed.

However, once it is determined that the loop has terminated, the process then proceeds to step 430 where it is determined whether the trip count field 215 is empty. This will be the case on the first occurrence of execution of the loop following allocation of an entry in the LTP 115, since at the time the entry is originally allocated the trip count field 215 will be left blank, or a predetermined value will be stored therein that is interpreted as the entry being blank, for example an all zeroes value.

If the trip count field is empty, then the process proceeds to step 435 where the architectural count from the architectural count field 220 is written into the trip count field 215, whereafter the process returns to step 415 to await the next occurrence of execution of the loop.

If at step 430 it is determined that the trip count is not empty, which will be the case for every occurrence of the loop other than the first occurrence, then at step 440 it is determined whether the architectural count value is the same as the current trip count value. If it is, then this indicates an increased likelihood in the stability of the total iteration count being tracked in the trip count field, and accordingly the process proceeds to step 450 where the confidence indication is incremented in order to indicate an increased confidence that the trip count value is stable.

At step 455, it is then determined whether the confidence indication has reached the threshold value, and if not the process returns to step 415 to await execution of another instance of the loop. However, if the confidence indication has reached the threshold, then the process proceeds to step 460 where it is determined that the training phase has ended. Thereafter, the training entry becomes a candidate for being promoted to an active entry within the active storage 195.

However, if at step 440 it is determined that the architectural count is not the same as the trip count, then this indicates that there is a lack of confidence in the stability of the trip count value currently being tracked, and accordingly at step 445 the confidence indication is reset. Thereafter, the process proceeds to step 435, where the current architectural count value is written to the trip count value, whereafter the process proceeds to step 415.

Figure 8:
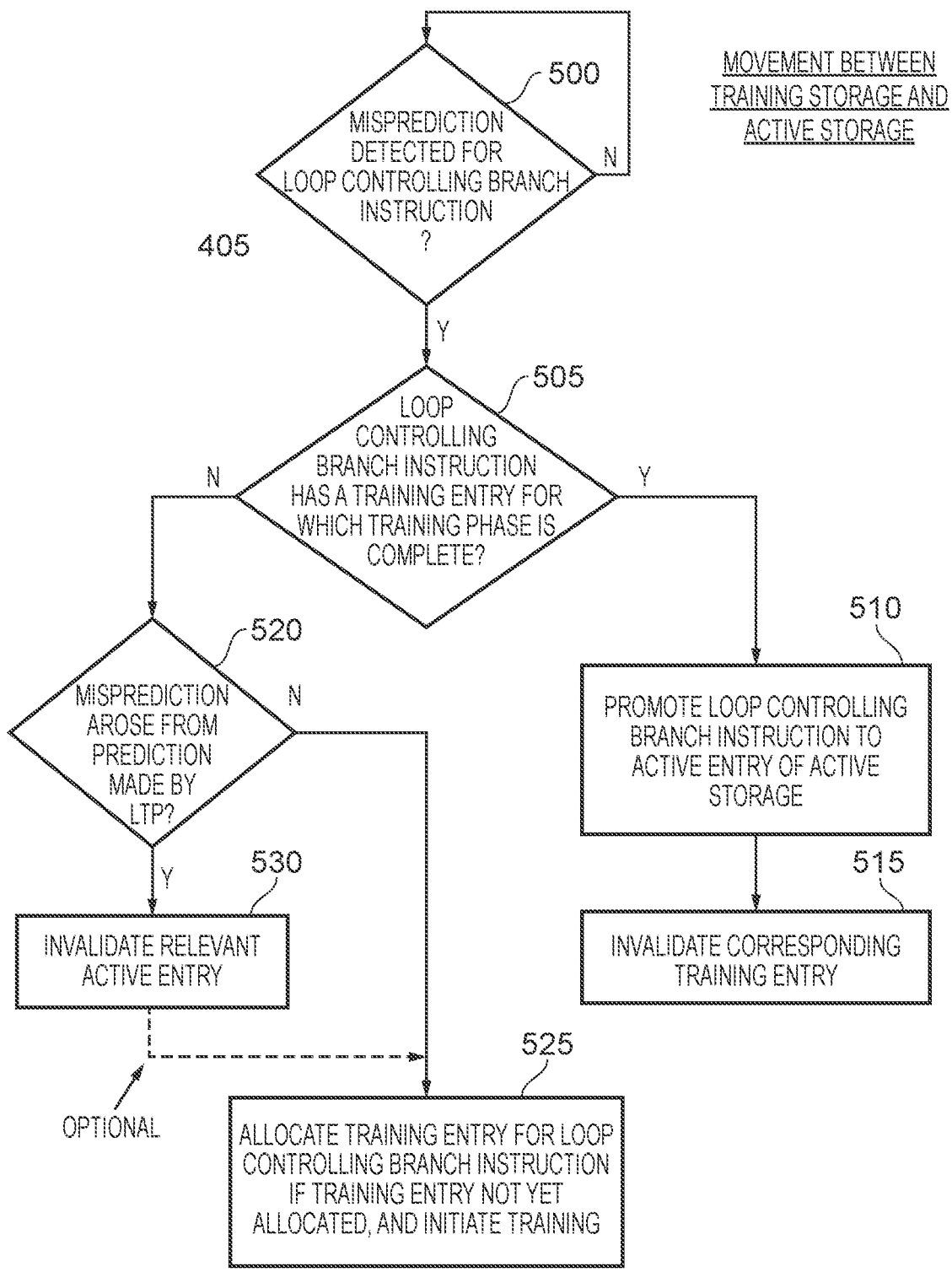
FIG. 8 is a flow diagram illustrating how information maintained in relation to a loop controlling branch instruction may be moved between entries of the training storage and the active storage in one example implementation.

FIG. 8 is a flow diagram illustrating how information may be moved between the training storage 190 and the active storage 195 in accordance with one example arrangement. At step 500, it is determined whether a misprediction has been detected for a loop controlling branch instruction. If so, it is determined at step 505 whether that loop controlling branch instruction has a training entry for which the training phase is complete, i.e. for which a threshold level of confidence has been reached in the stability of the total iteration count being tracked in the training entry.

If that is the case, then the process proceeds to step 510 where the loop controlling branch instruction is promoted to an active entry of the active storage 195, and then at step 515 the corresponding training entry is invalidated.

If at step 505 it is determined that the loop controlling branch instruction does not have a training entry for which the training phase is complete, then the process proceeds to step 520 where it is determined whether the misprediction detected at step 500 arose from a prediction made by the LTP. In particular, one of the reasons that the loop controlling branch instruction may not have a training entry is because it already has an active entry, and hence the prediction may have been made based on the active entry.

If the misprediction did arise from a misprediction made by the LTP, then the relevant entry in the active storage is invalidated at step 530, to prevent future predictions being made using the contents of that entry.

However, if the misprediction arose from a prediction made by another component of the branch prediction circuitry other than the LTP, then the process proceeds to step 525, where a training entry is allocated for the loop controlling branch instruction if a training entry has not yet been allocated, and then training is initiated.

It should be noted that, as indicated by the dotted line below box 530, if an active entry is invalidated at step 530, then in addition a training entry can be allocated for the relevant loop controlling branch instruction if desired, and training reinitiated in respect of that loop controlling branch instruction.

Figure 9:
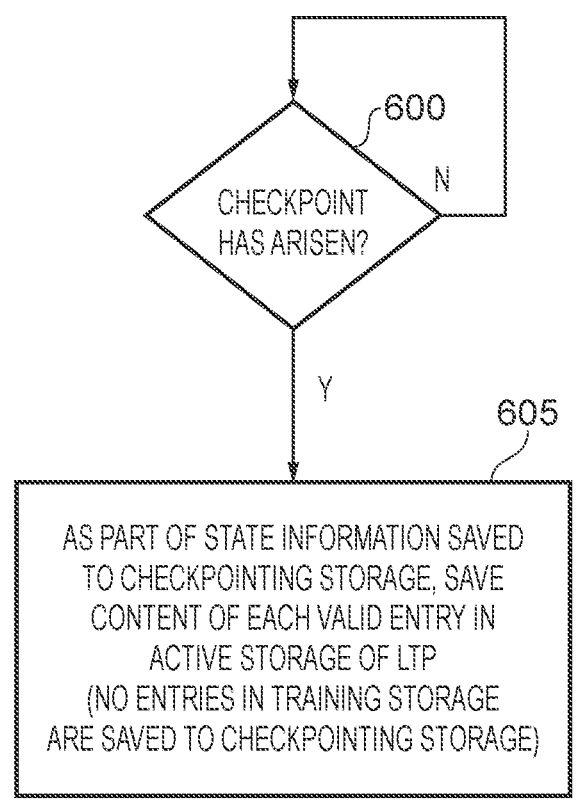
FIG. 9 is a flow diagram illustrating steps performed when a checkpoint is encountered, in accordance with one example arrangement.

FIG. 9 is a flow diagram illustrating a step taken each time a checkpoint arises. In particular, at step 600 it is determined whether a checkpoint has arisen, which will occur each time a prediction is made by the branch prediction circuitry 100 in one example implementation. Once a checkpoint has been detected, then at step 605, as part of the state information that is saved to the checkpointing storage 120, the contents of each valid entry in the active storage 195 of the LTP 115 is also saved. It should be noted at this stage that no entries in the training storage 190 are saved to the checkpointing storage, and this significantly reduces the amount of information that needs to be saved to the checkpointing storage in relation to the LTP 115 each time the checkpoint arises.

From the above described illustrative examples, it will be appreciated that the presently described technique provides an implementation for an event counting prediction circuit, for example a loop termination predictor, that allows efficient out-of-order recovery in the event of a misprediction. In particular it allows a significant reduction in the recovery storage needed for correct functioning of the predictor, which can significantly increase the attractiveness of using event counting prediction circuits such as loop termination predictors in out-of-order systems. By providing an efficient mechanism for providing a loop termination predictor in out-of-order systems, this can significantly boost the accuracy and efficiency of the branch prediction circuitry.

In accordance with the illustrated examples, the loop termination predictor consists of two main components. Firstly, a loop monitor is provided as a first component to contain architectural information which thus does not need to be checkpointed nor restored on occurrence of out-of-order flushing. The contents of that loop monitor storage are updated on branch commit, and only need to be read on an update, and therefore will not be looked up every cycle by the predictor (thus saving power). As a second component, the loop termination predictor 115 includes an active loop buffer which is a structure that is accessed by the predictor almost on every cycle, and whose contents must be checkpointed and restored on an out-of-order flush. The contents of the active buffer are updated speculatively.

Typically, a loop termination predictor arranged in such a manner can be configured so that the number of active entries in the active loop buffer are far smaller than the number of training entries in the loop monitor. For example, in one implementation it has been found that the loop monitor can have around 64 entries, whilst the active loop buffer can be significantly smaller, and may for example only require 4 entries. Since it is only the active entries that need to be checkpointed for every produced prediction, then in the above example only 4 counters need to be saved, to maintain the speculation count values for each of the entries.

As a further point of note, as the active loop buffer is looked up typically in almost every cycle, its power consumption will be important. Therefore, the ability to provide a reduced number of entries in the active loop buffer provides significant power consumption benefits.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute instructions out of order with respect to original program order;
event counting prediction circuitry to maintain event count values for branch instructions, for use in making branch outcome predictions for those branch instructions;
checkpointing storage to store state information of the apparatus at a plurality of checkpoints to enable the state information to be restored for a determined one of those checkpoints in response to a flush event;
the event counting prediction circuitry comprising training storage having a first number of training entries, each training entry being associated with a branch instruction, the event counting prediction circuitry being arranged to implement a training phase for each training entry during which the event counting prediction circuitry is arranged to seek to determine an event count value for the associated branch instruction based on branch outcome behaviour of the branch instruction observed for instances of execution of the branch instruction that have been committed by the processing circuitry;
the event counting prediction circuitry further comprising active storage having a second number of active entries, where the second number is less than the first number, each active entry being associated with a branch instruction for which an event count value has been successfully determined during the training phase, and the event counting prediction circuitry being arranged to make branch outcome predictions for branch instructions having an active entry;
wherein, at each checkpoint, state information for the active entries is stored to the checkpointing storage.

2. The apparatus as claimed in claim 1, wherein at each checkpoint, content of the training entries is omitted from the state information stored in the checkpointing storage.

3. The apparatus as claimed in claim 2, wherein each training entry is arranged to store only architectural information that does not need to be restored on occurrence of the flush event.

4. The apparatus as claimed in claim 1, wherein:
each active entry contains a speculation count value that indicates a number of branch outcome predictions that have been made for the associated branch instruction during speculative operation of the processing circuitry; and
at each checkpoint, the state information that is stored in the checkpointing storage contains an indication of the speculation count value for each active entry.

5. The apparatus as claimed in claim 1, wherein:
when a branch instruction is initially allocated into the event counting prediction circuitry, that branch instruction is allocated into a training entry of the training storage; and
upon occurrence of a promotion trigger, the branch instruction is allocated into an active entry in the active storage.

6. The apparatus as claimed in claim 5, wherein the promotion trigger for a branch instruction is prevented until an event count value has been successfully determined for that branch instruction during the training phase.

7. The apparatus as claimed in claim 6, wherein the promotion trigger occurs when a prediction made by additional prediction circuitry for the branch instruction is determined to be incorrect, at a time where an event count value has been successfully determined for that branch instruction during the training phase.

8. The apparatus as claimed in claim 5, wherein on allocating the branch instruction to an active entry in the active storage, the corresponding training entry is invalidated.

9. The apparatus as claimed in claim 1, wherein when the event counting prediction circuitry makes an incorrect branch outcome prediction for a branch instruction allocated into one of the active entries, the event counting prediction circuitry is arranged to invalidate that active entry.

10. The apparatus as claimed in claim 9, wherein on invalidating the active entry, the associated branch instruction is allocated into a training entry to cause the training phase to be reinitiated for that branch instruction.

11. The apparatus as claimed in claim 1, wherein the event count value is successfully determined during the training phase when the training phase has resulted in a sufficient confidence in the event count value.

12. The apparatus as claimed in claim 11, wherein:
each training entry has a training event count field to maintain an event count value that is updated during the training phase, and a confidence field to store a confidence value that indicates a confidence in accuracy of the event count value currently held in the event count field.

13. The apparatus as claimed in claim 12, wherein:
each active entry has an active event count field, on allocating a branch instruction to an active entry, the active event count field being arranged to store the current event count value from the training event count field.

14. The apparatus as claimed in claim 1, wherein:
the event counting prediction circuitry comprises loop termination prediction circuitry for maintaining an iteration count value for one or more loop controlling branch instructions that control repeated execution of an associated loop comprising a number of instructions, the iteration count value identifying the number of times the loop is to be executed;
during the training phase for a loop controlling branch instruction, the loop termination prediction circuitry is arranged to seek to identify whether the associated loop has a stable iteration count value; and
the loop termination prediction circuitry is arranged, when the training phase has successfully identified a stable iteration count value, to allow one of the active entries to be allocated for the associated loop controlling branch instruction to enable branch outcome predictions to be made for that loop controlling branch instruction based on the identified stable iteration count value.

15. The apparatus as claimed in claim 14, wherein each training entry comprises:
an identifier for the loop controlling branch instruction;
a trip count value identifying the iteration count value for the loop;
an architectural count value identifying, for an execution of the loop during the training phase, the number of iterations of the loop that have been committed by the processing circuitry; and
a confidence indication identifying a confidence in the stability of the iteration count value.

16. The apparatus as claimed in claim 15, wherein each active entry comprises:
an identifier of the branch instruction;
a speculation count value that indicates a number of branch outcome predictions that have been made for the associated branch instruction during speculative operation of the processing circuitry; and
an active trip count value, on allocating a branch instruction to an active entry, the active trip count value being set equal to the trip count value from the associated training entry.

17. The apparatus as claimed in claim 1, further comprising:
branch prediction circuitry to make branch outcome predictions for branch instructions, the event counting prediction circuitry being one component of the branch prediction circuitry;
wherein the flush event arises on detection of a misprediction of the branch outcome of a branch instruction that has been made by the branch prediction circuitry.

18. A method of performing branch prediction in an apparatus having processing circuitry to execute instructions out of order with respect to original program order, comprising:
employing event counting prediction circuitry to maintain event count values for branch instructions, for use in making branch outcome predictions for those branch instructions;
storing in checkpointing storage state information of the apparatus at a plurality of checkpoints to enable the state information to be restored for a determined one of those checkpoints in response to a flush event;
providing the event counting prediction circuitry with training storage having a first number of training entries, each training entry being associated with a branch instruction;
implementing a training phase for each training entry during which the event counting prediction circuitry is arranged to seek to determine an event count value for the associated branch instruction based on branch outcome behaviour of the branch instruction observed for instances of execution of the branch instruction that have been committed by the processing circuitry;
providing the event counting prediction circuitry with active storage having a second number of active entries, where the second number is less than the first number, each active entry being associated with a branch instruction for which an event count value has been successfully determined during the training phase;
employing the event counting prediction circuitry to make branch outcome predictions for branch instructions having an active entry; and
at each checkpoint, storing state information for the active entries to the checkpointing storage.

19. An apparatus comprising:
processing means for executing instructions out of order with respect to original program order;
event counting prediction means for maintaining event count values for branch instructions, for use in making branch outcome predictions for those branch instructions;
checkpointing storage means for storing state information of the apparatus at a plurality of checkpoints to enable the state information to be restored for a determined one of those checkpoints in response to a flush event;
the event counting prediction means comprising training storage means having a first number of training entries, each training entry being associated with a branch instruction, the event counting prediction means for implementing a training phase for each training entry during which the event counting prediction means seeks to determine an event count value for the associated branch instruction based on branch outcome behaviour of the branch instruction observed for instances of execution of the branch instruction that have been committed by the processing means;
the event counting prediction means further comprising active storage means having a second number of active entries, where the second number is less than the first number, each active entry being associated with a branch instruction for which an event count value has been successfully determined during the training phase, and the event counting prediction means for making branch outcome predictions for branch instructions having an active entry;
wherein, at each checkpoint, state information for the active entries is stored to the checkpointing storage means.

* * * * *